June 21, 1960
W. R. SIMMONS
2,941,687
PULLING DEVICE FOR BLIND RIVETS AND THE LIKE
Filed June 25, 1956
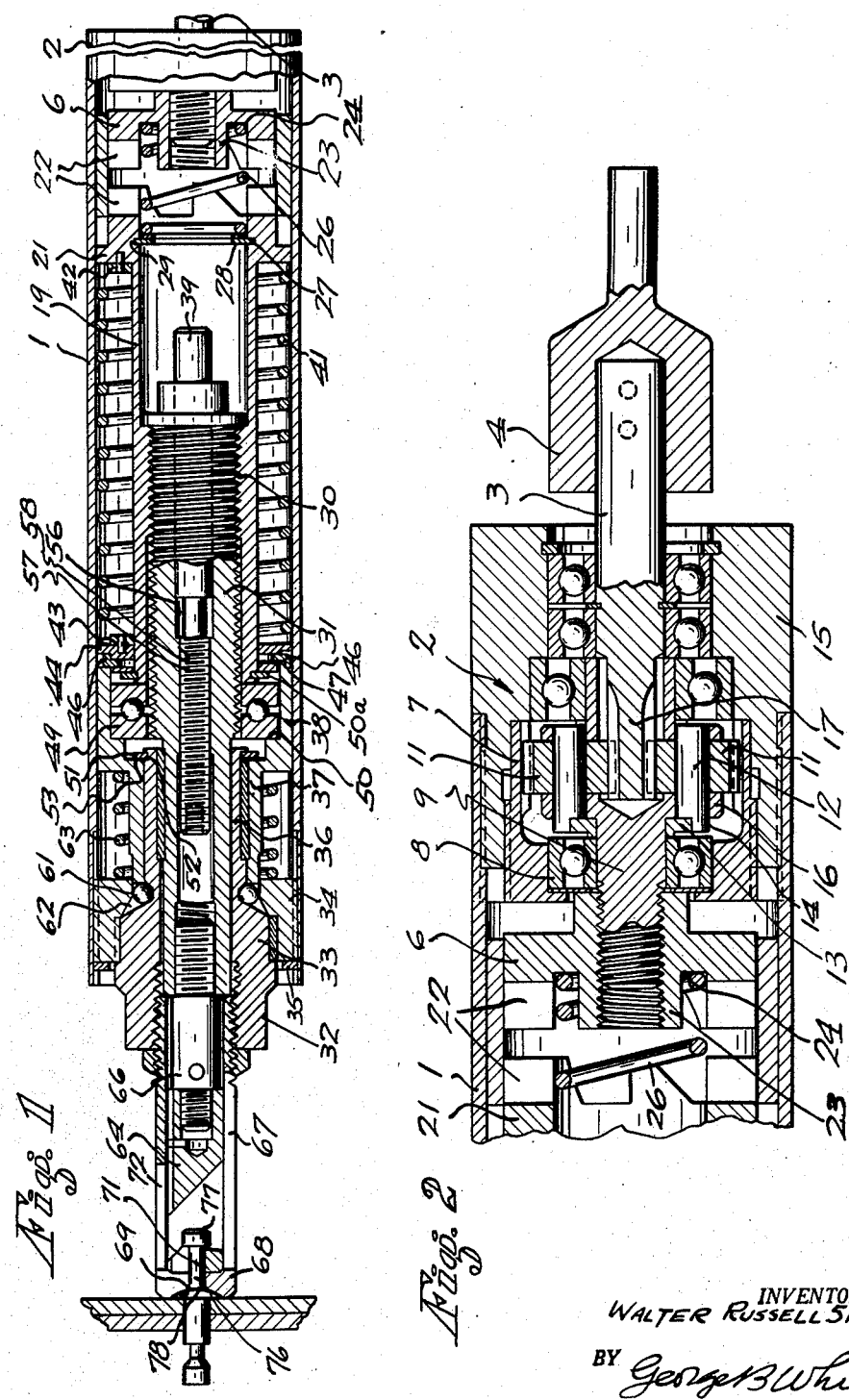
INVENTOR.
WALTER RUSSELL SIMMONS
BY George B White
ATTY.

United States Patent Office 2,941,687
Patented June 21, 1960

2,941,687

PULLING DEVICE FOR BLIND RIVETS AND THE LIKE

Walter Russell Simmons, Buena Park, Calif., assignor to Townsend Corporation, a corporation of Pennsylvania Filed June 25, 1956, Ser. No. 593,607

10 Claims. (Cl. 218—42)

The primary object of this invention is to provide a gun for installing a so-called blind rivet, wherein the force of setting is provided by converting rotating movement into reciprocating pulling movement of the pulling bolt of the setting tool.

Another object of the invention is to provide a device which can be used as an adapter for an electric or pneumatic drill of the type commonly found in general use in the construction industry so as to enable the installation of such blind rivets by the use of such electric or pneumatic drills, or other powered rotating devices, by converting the rotating force of such drill into lineal pulling force exerted on the rivet setting tool.

In such blind rivet usually a tubular member is inserted through the hole in the work to be riveted and a pulling stem is in the tubular member with a forming head at the tail end to engage the tail of the tubular member when the stem is pulled into or through the tubular member so as to spread the tail of the tubular member into a blind head; simultaneously sufficient force is exerted by the tool pressure on the exposed rivet head of the tubular member to clinch the work together tightly.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a sectional, partly fragmental, view of the pulling tool constructed in accordance with the invention described herein, and Fig. 2 is an enlarged fragmental sectional view of the driving end of said tool.

In the illustrative embodiment of the invention, I provide a tubular case 1, the interior of which is suitably bored at one end to accommodate a gear housing assembly 2. A shaft 3 extends from the rear end of this gear housing assembly 2 to be connected by a suitable adapter 4 thereon to a powered rotating drive, for instance, to the usual chuck of an electric or pneumatic drill.

The gear housing assembly 2 includes a planetary gear system which in this illustration is designed to increase the torque and decrease the speed approximately in the ratio of 7 to 1, so that a clutch jaw 6 on the forward end of the gear housing assembly 2 is driven at substantially lower speed than the driving motor and rotates continuously as long as the motor is operating.

In the present illustration this planetary gear includes a ring gear 7 in which is supported, on a ball bearing 8, a driven shaft 9 on the forward end of which is fixedly secured the clutch jaw 6. On the interior of the ring gear 7 ride a plurality of gears 11, the shafts 12 of which are held on a spacer ring 13 and also held in holes 14 circumferentially arranged in a flange 16 on the driven shaft 9. The gears 11 are in mesh with a center drive gear 17 formed on the forward end of the drive shaft 3, so that as the drive shaft 3 is rotated, it rotates the gears 11 which latter accordingly ride upon the inner periphery of the ring gear 7, which latter in turn is keyed to or otherwise held stationary by gear housing 15 fixed in case 1. Suitable bearings are provided in the rear end of the gear housing 15 to support the drive shaft 3 in aligned position. The movement of the gears 11 around the fixed ring gear 7 is transmitted by the gear flange 16 to the driven shaft 9 and thereby to the clutch jaw 6.

The tubular case 1 extends forwardly from the gear housing 15 and contains the various elements of the mechanisms for transmitting force to the pulling tool. Inside of the case 1 is a nut case 19 which latter is also tubular and of substantially smaller diameter than the outer tubular case 1 so as to be concentrically spaced from the case 1. On the end of the nut case 19 opposite the clutch jaw 6 is formed an integral clutch head 21 facing the clutch jaw 6. The clutch jaw 6 and the clutch head 21 have interlocking projections 22 for the purpose of engagement when the nut case 19 is pushed back into the tubular case 1 so as to engage its clutch head 21 with the clutch jaw 6. Thus rotation is transmitted to the nut case 19. The clutch jaw 6 has a central hub 23 around which is formed pocket 24 to accommodate a coil spring 26. One end of the coil spring 26 bears against the bottom of the pocket 24 in the clutch jaw 6 and the other end of the coil spring 26 bears against a fixed washer 27 held by a retaining ring 28 fixed in a groove 29 on the interior of the clutch head 21. This coil spring 26 normally urges the nut case 19 away from the clutch jaw 6.

In about the middle of the interior of the nut case 19 is a threaded boss 30 into which is threadedly secured a screw shaft 31. This screw shaft 31 is held against rotation in a manner to be hereinafter described, so that upon rotation of the nut case 19 the screw shaft 31 is caused to move axially in the nut case 19 toward the clutch head 21 for the purpose of exerting the pull required for the installation of blind rivets.

On the unthreaded pulling end of the screw shaft 31 is keyed a nose 32 which projects forwardly from the forward end of the tubular case 1. An enlarged head 33 on the rear portion of the nose 32 is keyed into a sleeve 34 which is located between the head 33 and the inner periphery of the case 1. The sleeve 34 is keyed suitably to the interior of the case 1 so as to be prevented from rotation but be axially slidable relatively to the case 1. A retaining ring 35 fastened in the casing 1 limits forward movement of the sleeve 34. A rearward tubular extension 36 of the nose member 32 is keyed on its outer periphery to the overlapping shank 37 of a non-rotatable bearing head 38 longitudinally slidable in the casing 1. In this manner rotation of the screw shaft 31 is prevented but longitudinal or axial movement of the shaft 31 in the nut case 19 is permitted.

The rear end of the screw shaft 31 has an adjustment or abutment rod 39 projecting therefrom adapted to engage the hub 23 of the clutch jaw 6 in the event the spring 26 fails to separate the clutch head 21 from the clutch jaw 6 upon release of the device or in the event the operator fails to release the forward thrust against the work piece in time and thus holds the clutch head 21 and clutch jaw 6 in positive engagement. As long as the clutch jaw 6 and the clutch head 21 are engaged, the continued rotation of the nut case 19 will cause the screw shaft 31 to slide rearwardly until its abutment rod 39 abuts against the clutch hub 23 and thereby forces disengagement of the clutch head 21 from the clutch jaw 6.

Within the cylindrical space between the case 1 and the nut case 19 is provided a coil spring 41. One end of the coil spring 41 is fixedly engaged by a suitable anchor 42 with the clutch head 21, and the other end of the coil spring 41 is anchored by similar anchor element 43 in a non-rotating plate 44. A pair of spring clips 46 in suitable slots 47 in the head 38 and in the plate 44 connect the anchor plate 44 to the non-rotatable bearing head 38. Inside of the hollow non-rotatable bearing head 38 is a suitable thrust bearing 49 which bears against the shoulder 50 in the head 38 and against the adjacent end of the nut case 19. A retaining ring 50a secured in a slot in the forward end of nut case 19 retains said nut case in thrust relationship against the thrust bearing 49. The threaded shaft 31 extends through this thrust bearing 49. A retaining ring 51 in a groove 52 on the rear end of the tubular extension 36 of the nose 32 bears against another shoulder 53 in the bottom of the recess in the hollow bearing head 38 so as to limit outward movement of the nose 32 relatively to the bearing head 38. A retaining ring 55a presents undue retraction of casing nut 19.

The abutment rod 39 is slidable in a passage 56 in the screw shaft 31. The end of the abutment rod 39 within the screw shaft 31 abuts a set screw 57 which latter is engaged in a threaded portion 58 of the inner passage 56 of the screw shaft 31. This set screw 57 functions so that when it is turned in either direction it can control and adjust the extension or projection of the abutment rod 39 beyond the end of the screw shaft 31 thereby to determine the length of the stroke after which disengagement of the clutch head 21 from the clutch 6 is forced by the abutment rod 39.

Under certain circumstances as hereinafter explained, where the stem of such blind rivet does not break, there remains a forward pulling force on the drawing tool due to the elasticity of the stem of the rivet being installed. This will cause sufficient friction in the threaded engagement between the screw shaft 31 and the nut case 19 to prevent the nut case 19 from being returned to the forward position by the action of the coil spring 41. In order to aid in overcoming this pulling action and friction there are provided a plurality of balls 61 in a wedge socket 62 between converging adjacent faces of the enlarged head 33 of the nose 32 and the near portion of the surrounding sleeve 34. A coil spring 63 around the shank 37 and between the non-rotatable bearing head 38 and the rear portion of the sleeve 34 normally presses the sleeve 34 toward the nose 32 and thereby keeps the balls 61 locked. By pulling the outer case 1 rearwardly to release the said locking action, the sleeve 34 is retracted by retaining ring 35 to allow the balls 61 to move in outward direction in the wedge socket 62 and thereby permit the nose 32 to retract a short distance toward the head 38. This retracting is just sufficient to relieve all of the pulling action of the rivet stem on the pulling tool so as to permit the elements of the device to return to their initial position.

A stem puller drawbolt 64 of the rivet setting tool is held on the threaded end of a stub shaft 66 which latter is also screwed into the threaded end of the passage 56 of the screw shaft 31. This drawbolt 64 is reciprocable in a cylindrical holder body 67 forming a pressure element suitably secured in the nose 32. A pressure head 68 on the end of the cylindrical holder body 67 has an engagement pocket 69 therein fitting over the head of the tubular rivet. The pressure head 68 has a lateral passage 71 through a side thereof to permit insertion of the stem of the type of blind rivet herein shown. The drawbolt 64 as well as the cylindrical holder body 67 have side slots 72 to receive the stem of the type of rivet shown in operative position.

It is understood that while a particular type of pulling head is shown for one type of blind rivet, this pulling device may be used with pulling heads fitting blind rivets of other stem construction than that herein illustrated.

In operation of the device the stem 76 and the pulling head 77 of the blind rivet are inserted in the side slots 72 in the position illustrated and then the tubular rivet is inserted into the work. Prior to that time the tool was attached to the powered rotating device, such as into the chuck of an air or electric drill, but when the tool is started the clutch jaw 6 is still spaced from the clutch head 21. Then the pocket 69 of the pressure head 68 is engaged tightly with the knob or head 78 of the blind rivet and with the motor running and the casing 1 and gear housing 15 held against rotation by the operator the gun is thrust against the rivet head 78 and against the work. This thrust is applied by pushing the casing 1 toward the work. This action causes overcoming of the resistance of the spring 26, so that the clutch jaw 6 is pushed into engagement with the clutch head 21 to rotate the nut casing 19. As the nut casing 19 rotates, the screw shaft 31 is drawn rearwardly pulling the drawbolt 64 and the rivet stem 76 therewith while the pressure head 68 is held against the rivet head.

After the blind rivet is set and the stem 76 breaks, the thrust or pressure is relieved by the operator and the draw bolt 64 is returned to its initial position for the next operation by the screw shaft 31. During the rotation of the clutch head 21 with the nut casing 19, the coil spring 41 is wound tight on account of the rotation of its chuck anchor 42. When the thrust or pressure is released on the gun, so as to allow the action of the spring 26 to again disengage the clutch head, or when the abutment rod 39 is pushed against the hub 23 so as to disengage the clutch head 21 from the clutch jaw 6, then the coil spring 41 unwinds itself to its initial position and rotates the nut casing 19 in opposite direction to the previous rotation thereof, and thereby returns the screw shaft 31 to the initial position. In this manner the drawbolt 64 is returned to its initial and operating position.

In the event that this tool is operated for pulling a blind rivet of the type wherein the stem is not broken but is pulled to a predetermined point, the stroke of the gun is to be set for the required amount by removing the pulling head structure and the stub shaft 66 so as to gain access to the set screw 57. By turning the set screw 57 the projection of the abutment rod 39 can be adjusted to the required stroke. After this adjustment the pulling head 64 and the stub shaft 66 are replaced in position. In this operation the rivet is inserted in the work being riveted and the pulling head is engaged over the knob and stem of the rivet as heretofore described. With the motor rotating pressure is again exerted against the rivet and the work to press the rivet head against the work and also to engage the driving mechanism as heretofore described. When the stem is pulled to the end of the predetermined stroke, the abutment rod 39 will positively disengage the clutch head 21 from the clutch jaw 6 and will stop the pulling action on the stem. Then the pressure is withdrawn by the operator and a slight rearward jerk given to the tool. This will cause the sleeve 34 to be retracted by the retaining ring 35 secured on the inner periphery of the casing 1 and allows the balls 61 to move forwardly in the wedge socket 62 and thereby permit the nose 32 to retract a short distance into the shank 37 of the head 38, and thus release the tension on the rivet stem and allow the automatic return mechanism to operate and return the draw bolt to its starting position. During this return period the pulling head is disengaged from the stem of the rivet and the tool is ready for the next operation for setting the rivet.

I claim:
1. In a pulling tool of the character described, a handle casing, a nose member non-rotatably held in one end of the casing, transmission means held in the other end of the casing, said handle casing with said transmission means being axially movable relatively to said nose member, a stem puller axially slidable through said nose member, means to prevent rotation of said stem puller relatively to said casing, an element rotatably held in the casing, means to convert rotation of said rotatable element into axial motion of said stem puller, means to restrain axial movement of said rotatable element relatively to said nose member, coacting clutch members on said rotatable element and on said transmission means for transmitting rotation from said transmission means to said rotatable element, resiliently yieldable means to urge said clutch members apart from one another so as to hold said clutch members disengaged, said clutch members being engageable by pressing the handle casing toward the work so as to overcome said resiliently yieldable means and thereby to transmit rotation from said transmission means to said rotatable element for pulling said stem puller; and resilient means anchored in said casing and wound by said rotatable element so as to unwind when said clutch members are separated and to rotate said rotatable member so as to return said stem puller into initial position.

2. In a pulling tool of the character described, a casing adapted to be manually held, a nose member non-rotatably held in one end of the casing, an element rotatably held by said nose member in said casing, a stem puller non-rotatably and axially slidably extended through said nose device, connecting means between said rotatable element and said stem puller to convert the rotation of said rotatable element into axial movement of said stem puller, transmission means in the other end of said casing, said nose member and said transmission means being capable of relative axial movement, coacting clutch members on said rotatable element and on said transmission means, resiliently yieldable means normally to urge said clutch members into disengaged position, said clutch members being engageable by pressure exerted on the tool toward the work for the relative axial movement of said nose member and said transmission means to overcome said resiliently yieldable means, and resilient means connected to said casing and to said rotatable element so as to be wound by rotation of said rotatable element when said stem puller is pulled and then to unwind for rotating said rotatable element so as to return said stem puller to its initial position.

3. In a pulling tool of the character described, a casing adapted to be manually held, a nose member non-rotatably held in one end of the casing, an element rotatably held by said nose member in said casing, a stem puller non-rotatably and axially slidably extended through said nose device, connecting means between said rotatable element and said stem puller to convert the rotation of said rotatable element into axial movement of said stem puller, transmission means in the other end of said casing, said nose member and said transmission means being capable of relative axial movement, coacting clutch members on said rotatable element and on said transmission means, resiliently yieldable means normally to urge said clutch members into disengaged position, said clutch members being engageable by pressure exerted on the tool toward the work for the relative axial movement of said nose member and said transmission means to overcome said resiliently yieldable means, and resilient means connected to said casing and to said rotatable element so as to be wound by rotation of said rotatable element when said stem puller is pulled and then to unwind for rotating said rotatable element so as to return said stem puller to its initial position, and adjustable abutment means on said stem puller to abut said transmission means for pushing said clutch members apart after a preadjusted stroke of said abutment with said stem puller.

4. In a pulling tool for setting fasteners having a stem to be pulled for said setting, a casing whereby the tool can be held, a nose device non-rotatably held in an end of the casing with freedom of limited relative axial movement to transmit pressure against the work when the casing is pressed toward the work, a stem puller in the casing axially movable relatively to said nose device and said casing, a rotatable element in the casing surrounding said stem puller, connecting means between said rotatable element and said stem puller to convert rotation of the former into axial lineal movement of the latter, means movable with said casing and engageable with said rotatable element by pressing said casing in the direction of said nose device to transmit rotation to said rotating element at will, said nose device and said casing being axially movable relatively to one another, means to prevent rotation of said nose device relatively to said casing, means to prevent rotation of said stem puller relatively to said nose device, said rotation transmitting means including a clutch element rotatably held in and movable with said casing, a complemental clutch element on said rotatable element, and resiliently yieldable means normally to urge said clutch elements apart into clutch-releasing position, said clutch elements being engaged by pressing and moving said casing toward and relatively to said nose piece, and journal means in said casing for said rotatable element.

5. In a pulling tool for setting fasteners having a stem to be pulled for said setting, a casing whereby the tool can be held, a nose device non-rotatably held in an end of the casing with freedom of limited relative axial movement to transmit pressure against the work when the casing is pressed toward the work, a stem puller in the casing axially movable relatively to said nose device and said casing, a rotatable element in the casing surrounding said stem puller, connecting means between said rotatable element and said stem puller to convert rotation of the former into axial lineal movement of the latter, means movable with said casing and engageable with said rotatable element by pressing said casing in the direction of said nose device to transmit rotation to said rotating element at will, said nose device and said casing being axially movable relatively to one another, means to prevent rotation of said nose device relatively to said casing, means to prevent rotation of said stem puller relatively to said nose device, said rotation transmitting means including a clutch element rotatably held in and movable with said casing, a complemental clutch element on said rotatable element, resiliently yieldable means normally to urge said clutch elements apart into clutch-releasing position, said clutch elements being engaged by pressing and moving said casing toward and relatively to said nose piece, journal means in said casing for said rotatable element, and an adjustable abutment on said stem puller adapted to abut against said first mentioned clutch element for pushing said complemental clutch element in clutch releasing position at the respective end of the stem pulling stroke.

6. In a pulling tool of the character described, a casing adapted to be manually held, a tubular nut rotatably held longitudinally in said casing and being spaced from the inner periphery of the casing, a puller threaded in said tubular nut, a nose device held on an end of the casing non-rotatably but axially slidably relatievly to said casing, connection means between said nose device and said puller to hold the latter against rotation but to permit axial movement of said puller, transmission means at the other end of the casing to transmit rotation to said tubular nut, normally resiliently released means for connecting said tubular nut to said transmission means under pressure exerted on said casing and on said nose device; and means energized by the rotation of said tubular nut by said transmission means to rotate said nut oppositely to said rotation when said pressure is released so as to return said puller to an initial position.

7. In a pulling tool of the character described, a casing adapted to be manually held, a tubular nut rotatably held longitudinally in said casing and being spaced from the inner periphery of the casing, a puller threaded in said tubular nut, a nose device held on an end of the casing non-rotatably but axially slidably relatively to said casing, connection means between said nose device and said puller to hold the latter against rotation but to permit axial movement of said puller, transmission means at the other end of the casing to transmit rotation to said tubular nut, normally resiliently released means for connecting said tubular nut to said transmisison means under pressure exerted on said casing and on said device, and a coil spring surrounding said tubular nut and having one end thereof held against rotative movement relatively to said casing and its other end connected to said tubular nut so as to be wound by said tubular nut when the latter is rotated by said transmission means and to unwind and turn said tubular nut oppositely to said rotation when said pressure is released so as to return said puller to an initial position.

8. In a pulling tool of the character described, a casing adapted to be manually held, a tubular nut rotatably held longitudinally in said casing and being spaced from the inner periphery of the casing, a puller threaded in said tubular nut, a nose device held on an end of the casing non-rotatably but axially slidably relatively to said casing, connection means between said nose device and said puller to hold the latter against rotation but to permit axial movement of said puller, transmission means fixed on the other end of the casing to transmit rotation to said tubular nut, normally resiliently released means for connecting said tubular nut to said transmission means under pressure exerted on said casing and on said nose device; and means energized by the rotation of said tubular nut by said transmission means to rotate said nut oppositely to said rotation when said pressure is released so as to return said puller to an initial position, said nose device including a sleeve slidably engaging said puller and extending from the forward end of the casing, a slidable, non-rotatable connection between the sleeve and the casing, and a limiting member in said forward end of the casing to limit the forward extension of said sleeve.

9. In a pulling tool of the character described, a casing adapted to be manually held, a tubular nut rotatably held longitudinally in said casing and being spaced from the inner periphery of the casing, a puller threaded in said tubular nut, a nose device held on an end of the casing non-rotatably but axially slidably relatively to said casing, connection means between said nose device and said puller to hold the latter against rotation but to permit axial movement of said puller, transmission means at the other end of the casing to transmit rotation to said tubular nut, normally resiliently released means for connecting said tubular nut to said transmission means under pressure exerted on said nose device; and means energized by the rotation of said tubular nut by said transmission means to rotate said nut oppositely to said rotation when said pressure is released so as to return said puller to an initial position, said nose device including a nose sleeve slidably engaging said puller and extending from the forward end of the casing, an outer sleeve surrounding a portion of said nose sleeve being slidably and not rotatably connected to said nose sleeve and to said casing, a bearing head in the casing at the end of said tubular nut nearest to said nose device, means to prevent rotation of said bearing head in said casing, a thrust bearing in said bearing head bearing against the said nearest end of the tubular nut, and means on said tubular nut coacting with said bearing head to restrain axial motion of said tubular nut in said casing said nose sleeve having an enlarged nose portion and said outer sleeve bearing against said nose portion, a spring between said outer sleeve and said bearing head to urge said outer sleeve and said nose portion forwardly of the casing, an abutment in the casing to limit the forward position of said nose device, a socket formed between said enlarged nose portion and said outer sleeve tapering generally toward to forward end of the casing, a plurality of spacer balls in said socket adapted to ride outwardly of said socket when the casing is pulled back so as to pull back said outer sleeve relatively to said nose portion so as to permit release of locking pressure on said nose device and on said puller.

10. In a pulling tool of the character described, a casing adapted to be manually held, a tubular nut rotatably held longitudinally in said casing and being spaced from the inner periphery of the casing, a puller threaded in said tubular nut, a nose device held on an end of the casing non-rotatably but axially slidably relatively to said casing, connection means between said nose device and said puller to hold the latter against rotation but to permit axial movement of said puller, transmission means at the other end of the casing to transmit rotation to said tubular nut, normally resiliently released means for connecting said tubular nut to said transmission means under pressure exerted on said casing and said nose device; and means energized by the rotation of said tubular nut by said transmission means for rotating said nut when said pressure is released oppositely to said rotation by said transmission means so as to return said puller to an initial position, means in said nose device to hold the pressure member of a rivet setting tool, and means to connect said puller to the stem puller of a rivet setting tool.

References Cited in the file of this patent
UNITED STATES PATENTS

| 1,029,396 | Norden | June 11, 1912 |
| 1,870,366 | Kearney | Aug. 9, 1932 |
| 2,384,037 | Kugler | Sept. 4, 1945 |
| 2,402,303 | Stone | June 18, 1946 |
| 2,625,967 | Stull | Jan. 20, 1953 |